(12) United States Patent
Matsushima

(10) Patent No.: US 11,759,986 B2
(45) Date of Patent: Sep. 19, 2023

(54) MOLD APPARATUS

(71) Applicant: HONDA MOTOR CO., LTD., Tokyo (JP)

(72) Inventor: Hiroshi Matsushima, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 61 days.

(21) Appl. No.: 17/361,360

(22) Filed: Jun. 29, 2021

(65) Prior Publication Data

US 2022/0001585 A1 Jan. 6, 2022

(30) Foreign Application Priority Data

Jul. 2, 2020 (JP) ................. 2020-114850

(51) Int. Cl.
*B29C 45/26* (2006.01)
*B29C 45/44* (2006.01)
*B29C 45/76* (2006.01)

(52) U.S. Cl.
CPC ...... *B29C 45/2681* (2013.01); *B29C 45/2608* (2013.01); *B29C 45/44* (2013.01); *B29C 45/76* (2013.01); *B29C 2945/76742* (2013.01)

(58) Field of Classification Search
CPC ................................................. B29C 45/2681
See application file for complete search history.

(56) References Cited

U.S. PATENT DOCUMENTS 4,588,095 A * 5/1986 Mehra ................. B01L 9/06
211/74

2016/0185022 A1 6/2016 Uchi et al.
2020/0254660 A1 8/2020 Uchi et al.

FOREIGN PATENT DOCUMENTS

| JP | 06-114893 | | 4/1994 | |
|---|---|---|---|---|
| JP | 2002067088 | A * | 3/2002 | |
| JP | 2012251518 | A * | 12/2012 | ......... B29C 45/4435 |
| JP | 6109809 | | 4/2017 | |
| WO | 2019/065433 | | 4/2019 | |

OTHER PUBLICATIONS

Machine translation JPH06114893A (Year: 1994).*
Machine translation JP2002067088A (Year: 2002).*
Machine translation JP2012251518A (Year: 2012).*
Machine translation WO2018065433A1 (Year: 2019).*

* cited by examiner

*Primary Examiner* — Matthew J Daniels
*Assistant Examiner* — Wayne K. Swier
(74) *Attorney, Agent, or Firm* — AMIN, TUROCY & WATSON, LLP

(57) ABSTRACT

A rotary core includes an undercut portion molding section for molding an undercut portion in a resin-molded article, and a seal portion abutting on a mold main body. In a side view viewed from a direction orthogonal to the direction in which a shaft member serving as the rotation center of the rotary core extends, a first imaginary line extending along the inner edge of the seal portion, and a second imaginary line extending from the rotation center to the first imaginary line and orthogonal to the first imaginary line are drawn. The seal portion includes a portion that is located on a lower side of the second imaginary line and is bent inward in the width direction as compared with a portion of the seal portion that is located on an upper side of the second imaginary line.

5 Claims, 10 Drawing Sheets

MOLD APPARATUS

CROSS-REFERENCE TO RELATED APPLICATION

This application is based upon and claims the benefit of priority from Japanese Patent Application No. 2020-114850 filed on Jul. 2, 2020, the contents of which are incorporated herein by reference.

BACKGROUND OF THE INVENTION

Field of the Invention

The present invention relates to a mold apparatus for obtaining a resin molded article having a main body portion and an undercut portion.

Description of the Related Art

It is known that a cavity for molding an undercut portion of a resin molded article is formed by a rotary core (see, for example, JP H06-114893 A). In this case, after the resin molded article having the undercut portion is obtained, the rotary core is rotated. Thus, the rotary core is easily released from the undercut portion.

When the molten resin is injected into the cavity, resin pressure is applied to the mold main body and the cavity forming surface of the rotary core. This resin pressure pushes the rotary core toward the mold main body. As a result, the mold main body interferes with the rotary core. When the degree of interference is large, it is difficult for the rotary core to rotate, in other words, to be released from the undercut portion. In order to overcome this drawback, the applicant of the present invention has proposed a mold apparatus in JP 6109809 B2 and in WO 2019/065433 A1. In these mold apparatuses, a regulating core is interposed between the rotary core and the mold main body during molding, and the regulating core is removed from between the rotary core and the mold main body after completion of molding. In these mold apparatuses, since a space is formed in a portion where the regulating core was located, the rotary core can be easily rotated.

SUMMARY OF THE INVENTION

In the above configuration, it is necessary to prevent the molten resin from leaking from between the mold main body and the rotary core. For this reason, the rotary core is provided with a seal portion that abuts on the mold main body. Here, the undercut portion molding section of the rotary core rotates in a direction away from the undercut portion after molding the undercut portion. At this time, if the position of the rotation center axis is inappropriate, the seal portion interferes with the mold main body.

A main object of the present invention is to provide a mold apparatus capable of obtaining sufficient sealing performance.

Another object of the present invention is to provide a mold apparatus in which a rotary core during rotation is prevented from interfering with a mold main body.

According to an embodiment of the present invention, there is provided a mold apparatus that molds a resin molded article including a main body portion and an undercut portion, the mold apparatus comprising:

a mold main body configured to mold the main body portion, and having a window portion formed therein;

a rotary core including an undercut portion molding section configured to rotate in a direction in which the undercut portion molding section enters or moves away from the window portion, mold the undercut portion when entering the window portion, and move away from the undercut portion when moving away from the window portion;

a regulating core configured to regulate rotation of the rotary core by entering between the mold main body and the rotary core and supporting the rotary core during molding, and move away from between the mold main body and the rotary core when the rotary core is released from the undercut portion;

a shaft member configured to support the rotary core on the mold main body and serving as a rotation center of the rotary core; and a rotary driving device configured to apply a rotary driving force to the rotary core to rotate the rotary core about the shaft member, wherein the rotary core includes a seal portion configured to abut on the mold main body to seal between the rotary core and the mold main body, and in a case where a side where the shaft member is located is defined as a lower side, a side where the undercut portion molding section is located is defined as an upper side, a direction in which the shaft member extends is defined as a width direction, and a direction orthogonal to the width direction is defined as a thickness direction, when a first imaginary line extending along an inner edge of the seal portion and a second imaginary line extending from the rotation center of the rotary core toward the first imaginary line and orthogonal to the first imaginary line are drawn in a side view in which the rotary core is viewed along the thickness direction, the seal portion includes a portion that is located on a lower side of the second imaginary line and is bent inward in the width direction as compared with a portion of the seal portion that is located on an upper side of the second imaginary line.

According to the present invention, the predetermined portion of the rotary core is bent so as to be away from the mold main body. Therefore, when the rotary core rotates, the bent portion is prevented from interfering with the mold main body.

In addition, since the gap between the rotary core and the mold main body is sealed by the seal portion, it is possible to avoid leakage of the molten resin.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

In the following description, the terms "front", "rear", "left", and "right" respectively indicate the front, rear, left, and right sides of an occupant seated in a driver's seat of an automobile. The "vehicle width direction" is synonymous with the "left-right direction". The terms "upper" and "lower" indicate the upper side and the lower side of the occupant, respectively, unless otherwise specified.

Figure 1:
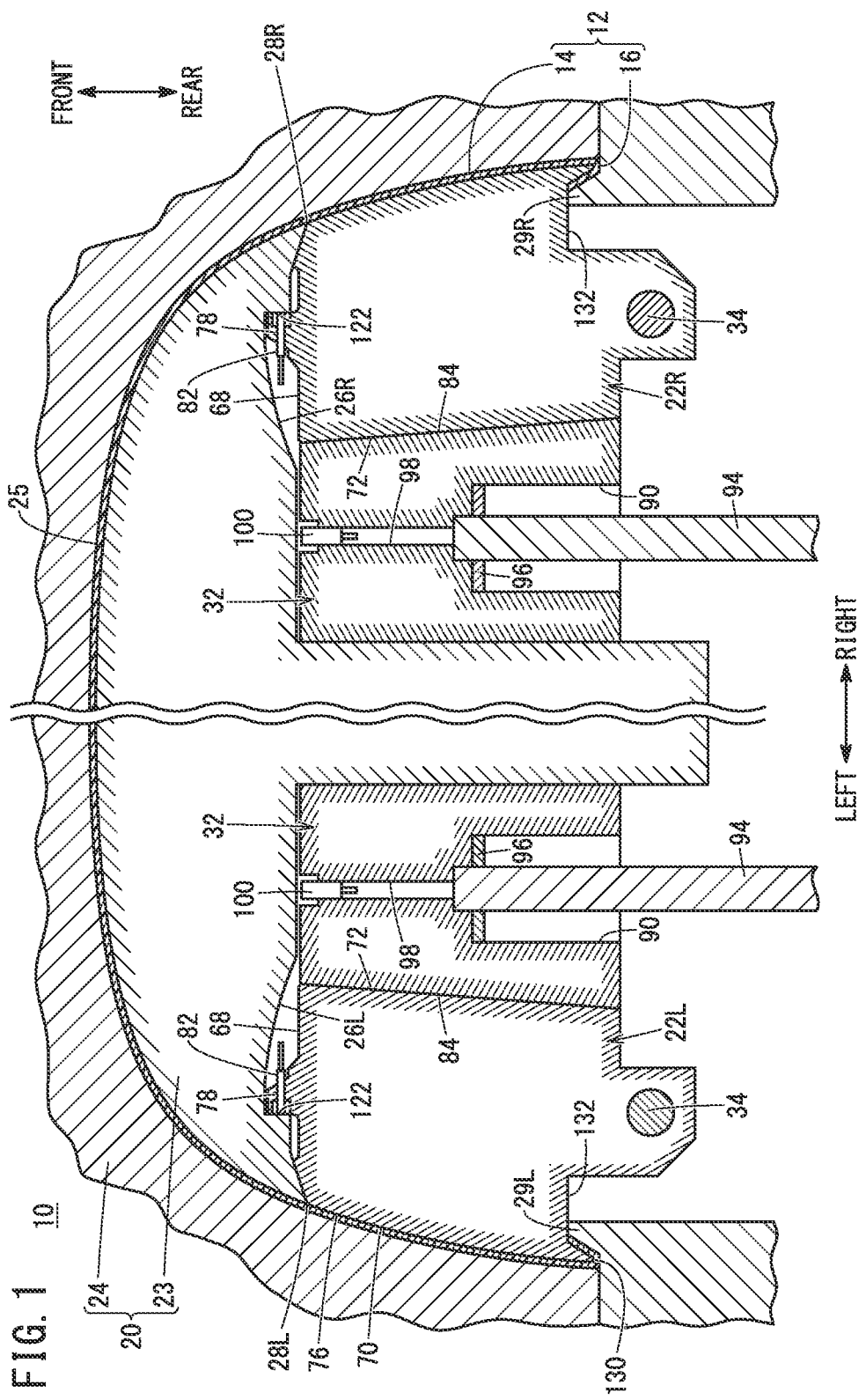
FIG. 1 is a schematic plan sectional view of a main part of a mold apparatus according to an embodiment of the present invention.

FIG. 1 is a schematic plan sectional view of a main part of a mold apparatus 10 according to the present embodiment. The mold apparatus 10 is an injection molding apparatus for obtaining a front bumper 12 of an automobile as a resin molded article. The front bumper 12 has a main body portion 14, and an undercut portion 16 formed at an end portion of the main body portion 14. The undercut portion 16 has a substantially V-shaped cross section. The undercut portion 16 serves as a hook portion for attaching the front bumper 12 to the vehicle body. The up-down direction and the left-right direction of the paper surface of FIG. 1 correspond to the front-rear direction and the left-right direction (vehicle width direction) of the automobile, respectively.

The mold apparatus 10 includes a mold main body 20 for molding most of the main body portion 14, a left rotary core 22L, and a right rotary core 22R. More specifically, the mold main body 20 includes a fixed mold 23 that is positioned and fixed, and a movable mold 24 that is moved toward or away from the fixed mold 23 by a displacement mechanism (for example, a hydraulic cylinder) (not shown). A cavity 25 for obtaining the front bumper 12 is formed by the left rotary core 22L, the right rotary core 22R, the fixed mold 23, and the movable mold 24. The movable mold 24 is used for molding an outer surface (so-called design surface) visually recognized by a user, and the fixed mold 23 is used for molding a back surface of the front bumper 12.

In the fixed mold 23, a left housing recess 26L and a right housing recess 26R are formed by hollowing out a part of the fixed mold 23. In addition, a left window portion 28L and a right window portion 28R are formed so as to penetrate the fixed mold 23 along the thickness direction. Further, near the left window portion 28L and the right window portion 28R, a left convex portion 29L and a right convex portion 29R are provided so as to protrude forward. The main body of the fixed mold 23, the left convex portion 29L, and the right convex portion 29R form respective spaces into which undercut portion molding sections 130 (described later) of the left rotary core 22L and the right rotary core 22R enter.

Figure 2:
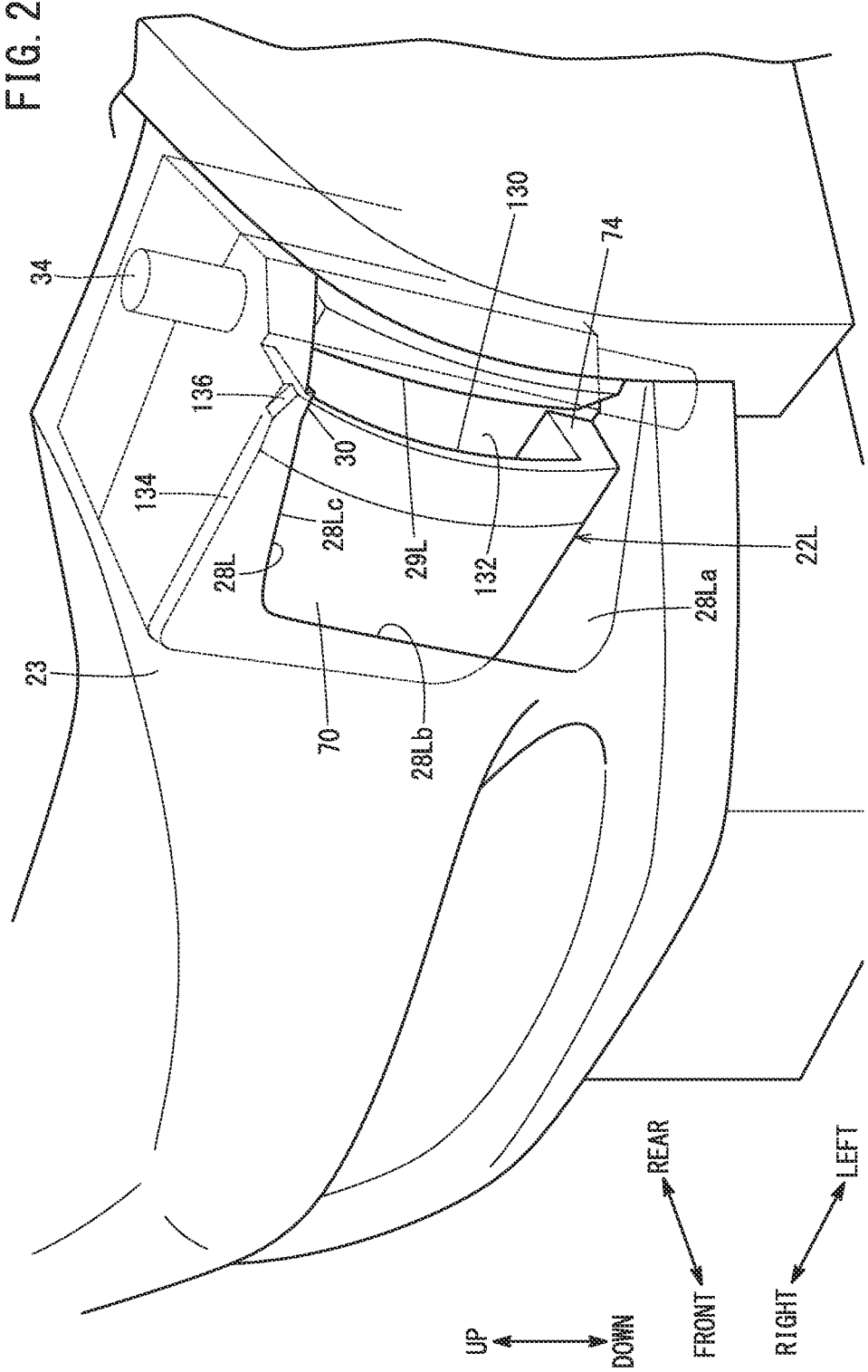
FIG. 2 is a schematic perspective view of main parts of a fixed mold and a rotary core constituting the mold apparatus of FIG. 1.

FIG. 2 is a main part enlarged perspective view in which the vicinity of the left window portion 28L of the fixed mold 23 is enlarged. A seal portion 134 (see FIG. 3 in particular), which will be described later, of the left rotary core 22L abuts on a bottom wall 28La, a front wall 28Lb, and a ceiling wall 28Lc of the left window portion 28L. The seal portion 134 seals between the left rotary core 22L and the movable mold 24. As will be described later, the bottom wall 28La, the front wall 28Lb, and the ceiling wall 28Lc are inclined in a tapered shape.

Here, the rear end portion of the left edge of the ceiling wall 28Lc is an inclined surface 30 inclined toward the bottom wall 28La, from the front side toward the rear side. Although not particularly shown, the right window portion 28R is configured in the same manner as the left window portion 28L. That is, the rear end portion of the right edge of the ceiling wall of the right window portion 28R is an inclined surface inclined toward the bottom wall, from the front side toward the rear side.

The left rotary core 22L and a regulating core 32 are housed in the left housing recess 26L. Similarly, the right rotary core 22R and the regulating core 32 are housed in the right housing recess 26R. Next, the rotary cores 22L and 22R and the two regulating cores 32 will be described by exemplifying the left rotary core 22L and the regulating core 32 housed in the left housing recess 26L.

Figure 3:
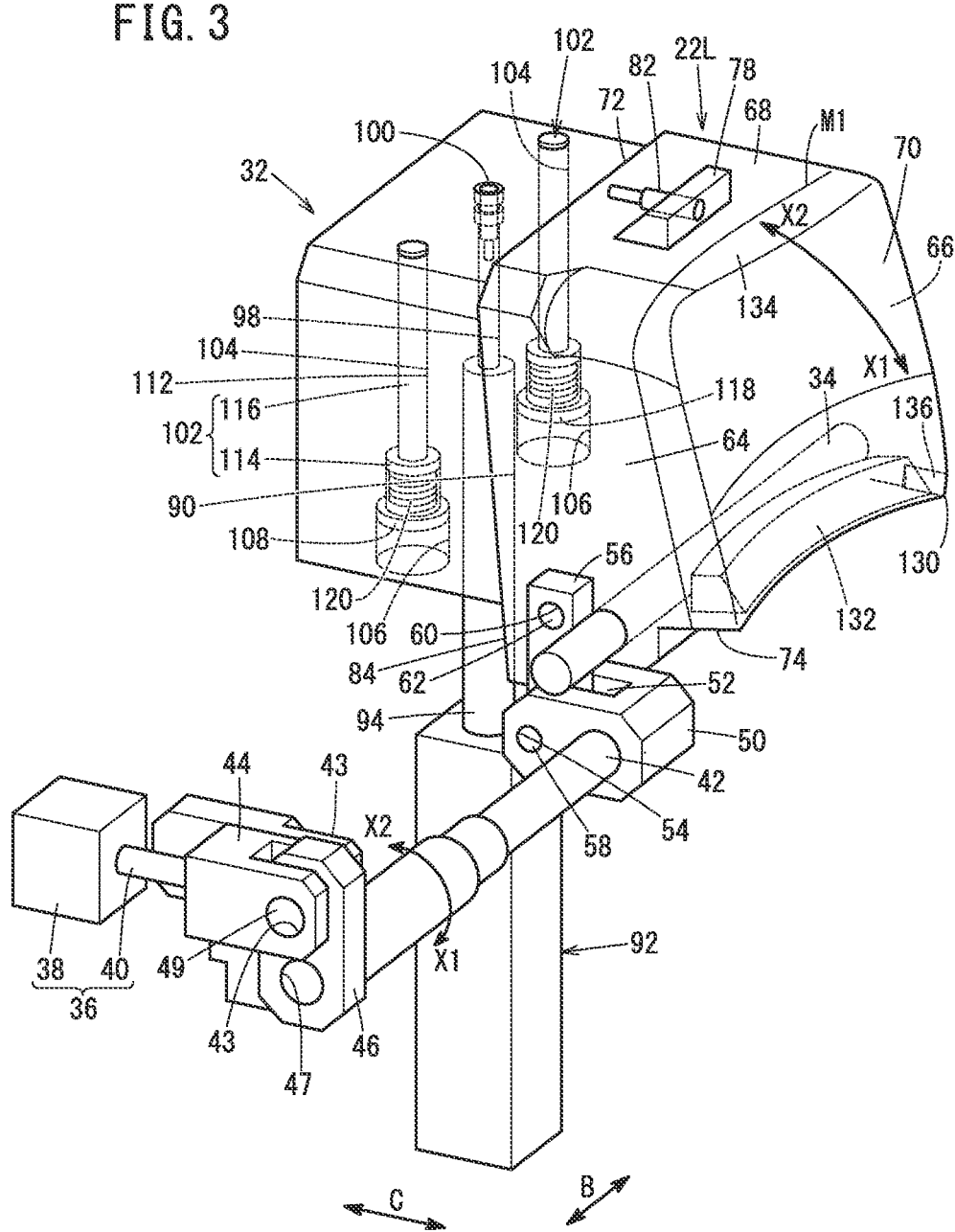
FIG. 3 is a main part schematic perspective view showing a rotary core, a regulating core, and a cylinder (rotary driving device) that applies a rotary driving force to the rotary core.

As shown in FIGS. 1 and 3, the left rotary core 22L has a shaft member 34 rotatably supported by the fixed mold 23. As will be described later, the shaft member 34 serves as the rotation center of the left rotary core 22L. The left rotary core 22L rotates under the action of a first cylinder 36 which is a rotary driving device. An end portion of a cylinder tube 38 of the first cylinder 36 is connected to the fixed mold 23.

Figure 4:
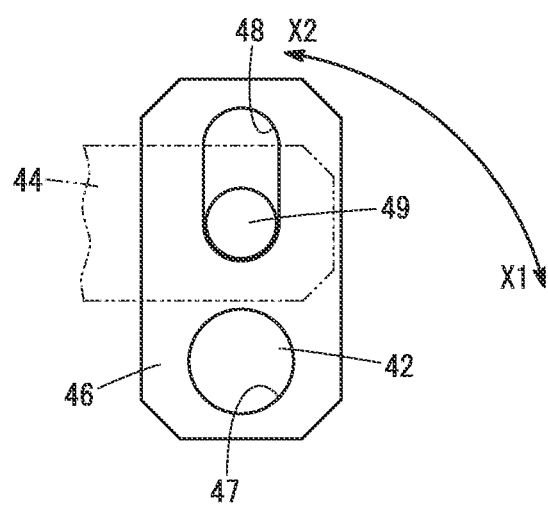
FIG. 4 is a main part schematic plan view showing a connection relationship between a bifurcated bracket, a first connecting board, and a rotating shaft that are shown in FIG. 3.

More specifically, a first rod 40 of the first cylinder 36 and the left rotary core 22L are connected to each other via a connecting shaft 42 (driving force transmission shaft) extending along the direction of the arrow B in FIG. 3. That is, a bifurcated bracket 44 is provided at the distal end of the first rod 40. In the bifurcated bracket 44, shaft holes 43 are formed in two wall portions facing each other. A first connecting board 46 extending along the front-rear direction is fitted to the outer periphery of the first end of the connecting shaft 42. A fitting hole 47 into which the first end of the connecting shaft 42 is fitted and an elongated hole 48 shown in FIG. 4 are formed in the first connecting board 46. The shaft hole 43, the elongated hole 48, and another shaft hole 43 are aligned in this order. A pivot shaft 49 is inserted into the shaft hole 43, the elongated hole 48, and the other shaft hole 43. The first rod 40 of the first cylinder 36 and the connecting shaft 42 are connected to each other via the pivot shaft 49.

A U-shaped bracket 50 having a substantially U shape is connected to the second end of the connecting shaft 42. The U-shaped bracket 50 extends along the up-down direction of the front bumper 12. The U-shaped bracket 50 has a U-shaped groove 52 opened toward the regulating core 32. An insertion hole 54 is formed in the vicinity of the U-shaped groove 52. A through-hole (not shown) continuous with the insertion hole 54 is formed in a second connecting board 56 having a flat plate shape and inserted into the U-shaped groove 52. The second connecting board 56 is connected to the U-shaped bracket 50 via a first transmission shaft 58 fitted into the insertion hole 54 and the through hole.

A connecting hole 60 is further formed in the second connecting board 56. On the other hand, a press-fit hole (not shown) is formed at a position, which corresponds to the position of the connecting hole 60, in the left rotary core 22L. A second transmission shaft 62 passed through the connecting hole 60 is fitted into the press-fit hole, whereby the connecting shaft 42 is connected to the left rotary core 22L via the U-shaped bracket 50 and the second connecting board 56.

The U-shaped bracket 50 is located rearward of the shaft member 34. That is, the center of the connecting shaft 42 is disposed with an offset from the center of the shaft member 34. In this way, by disposing the connecting shaft 42 with an offset from the shaft member 34 (the rotation center of the left rotary core 22L), flexibility in the layout of the first cylinder 36 is improved. Therefore, flexibility in the design of the mold apparatus 10 is increased.

The left rotary core 22L has a lower surface 64 facing downward of the vehicle body, an upper surface 66 facing upward, a front surface 68 facing forward, a cavity forming surface 70 facing the cavity 25, a supported surface 72 facing the regulating core 32, and a rear surface 74 facing rearward. The cavity forming surface 70 faces the left side of the vehicle body, and the supported surface 72 faces the right side. A detailed configuration of the left rotary core 22L will be described later.

A stopper portion 78 (stopper) protruding toward the mold main body 20 is formed on the front surface 68. A detection portion of a first position sensor 82 is embedded in the stopper portion 78.

The supported surface 72 is an inclined surface inclined at a low angle with respect to the front-rear direction of the vehicle body, in a direction away from the regulating core 32 as the supported surface 72 approaches the second connecting board 56. The supported surface 72 abuts on a regulating surface 84 of the regulating core 32. By this abutment, the supported surface 72 is supported by the regulating surface 84. The regulating surface 84 approaches the left rotary core 22L as approaching the second connecting board 56 at an angle corresponding to the inclination angle of the supported surface 72.

A fixed hole 90 extending toward the front surface of the regulating core 32 is formed in the bottom portion of the regulating core 32. A second rod 94 of a second cylinder 92 is inserted into the fixed hole 90. By being passed through a press-fit ring 96 (see FIG. 1) press-fitted into the fixed hole 90, the second rod 94 is prevented from coming out of the fixed hole 90. Therefore, the regulating core 32 enters the left housing recess 26L as the second rod 94 moves forward. On the other hand, the regulating core 32 is retracted from the left housing recess 26L as the second rod 94 moves backward.

A small hole 98 having an inner diameter smaller than that of the fixed hole 90 is continuous with the fixed hole 90. A second position sensor 100 is housed in the small hole 98.

Figure 5:
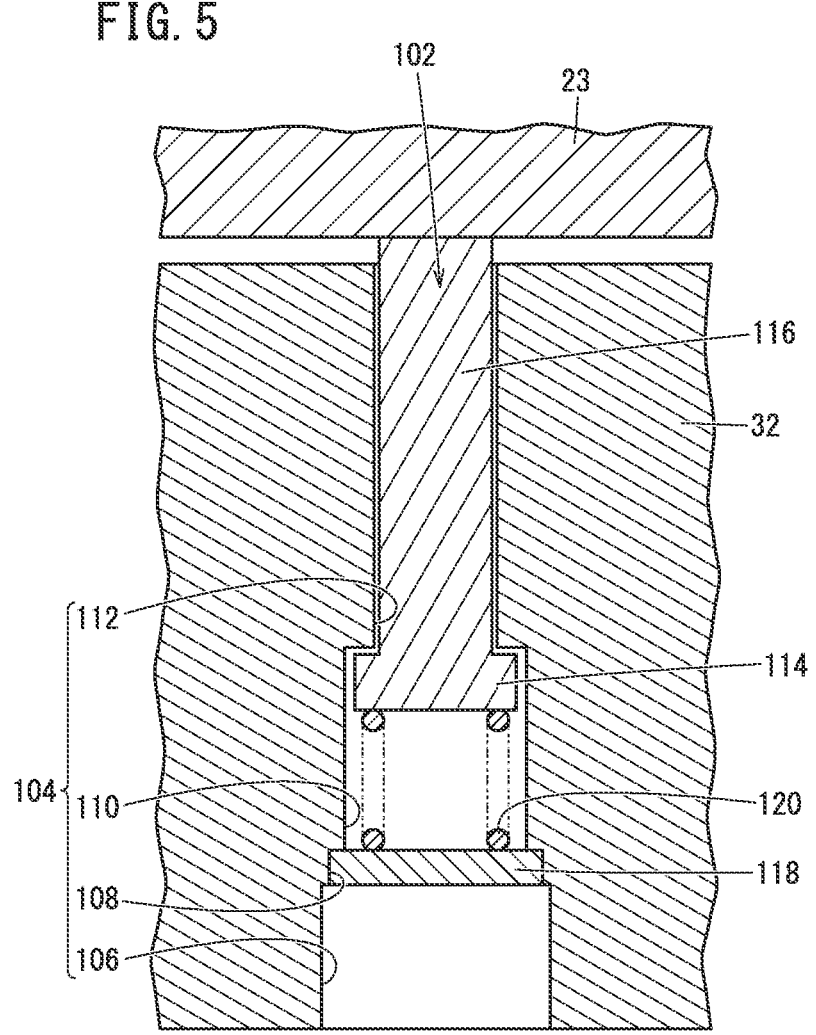
FIG. 5 is a schematic plan sectional view of a main part of the regulating core.

The regulating core 32 is further provided with a housing hole 104 housing an abutment member 102. As shown in FIG. 5, the housing hole 104 includes a large-diameter hole 106 having a maximum inner diameter, an attachment hole 108 having a slightly smaller inner diameter than the large-diameter hole 106, a medium-diameter hole 110 having a medium inner diameter, and a small-diameter hole 112 having a minimum inner diameter. The large-diameter hole 106, the attachment hole 108, the medium-diameter hole 110, and the small-diameter hole 112 are connected to form the housing hole 104. The abutment member 102 includes a large-diameter cylindrical portion 114 and a small-diameter cylindrical portion 116. The large-diameter cylindrical portion 114 has a larger diameter than the small-diameter hole 112. The distal end of the small-diameter cylindrical portion 116 is inserted into the small-diameter hole 112 and protrudes from the small-diameter hole 112. A closing cap 118 is attached to the attachment hole 108. The housing hole 104 is closed by the closing cap 118.

A coil spring 120 is inserted between the closing cap 118 and the large-diameter cylindrical portion 114. The abutment member 102 is elastically biased toward the movable mold 24 by the coil spring 120. Due to this elastic biasing, the distal end of the small-diameter cylindrical portion 116 of the abutment member 102 always protrudes from the regulating core 32.

In the movable mold 24, a latching portion 122 for latching the stopper portion 78 is formed to protrude toward the fixed mold 23. The movable mold 24 is cut out so as to be curved in the vicinity of the latching portion 122. Therefore, the stopper portion 78 can be rotated in a direction approaching or receding from the latching portion 122.

The configuration of the left rotary core 22L will be described. As shown in FIG. 2, the cavity forming surface 70 of the left rotary core 22L is a curved surface having a lower portion and an upper portion with different radii of curvature. A radius of curvature of the lower portion of the curved surface is greater than a radius of curvature of the upper portion of the curved surface.

Figure 6:
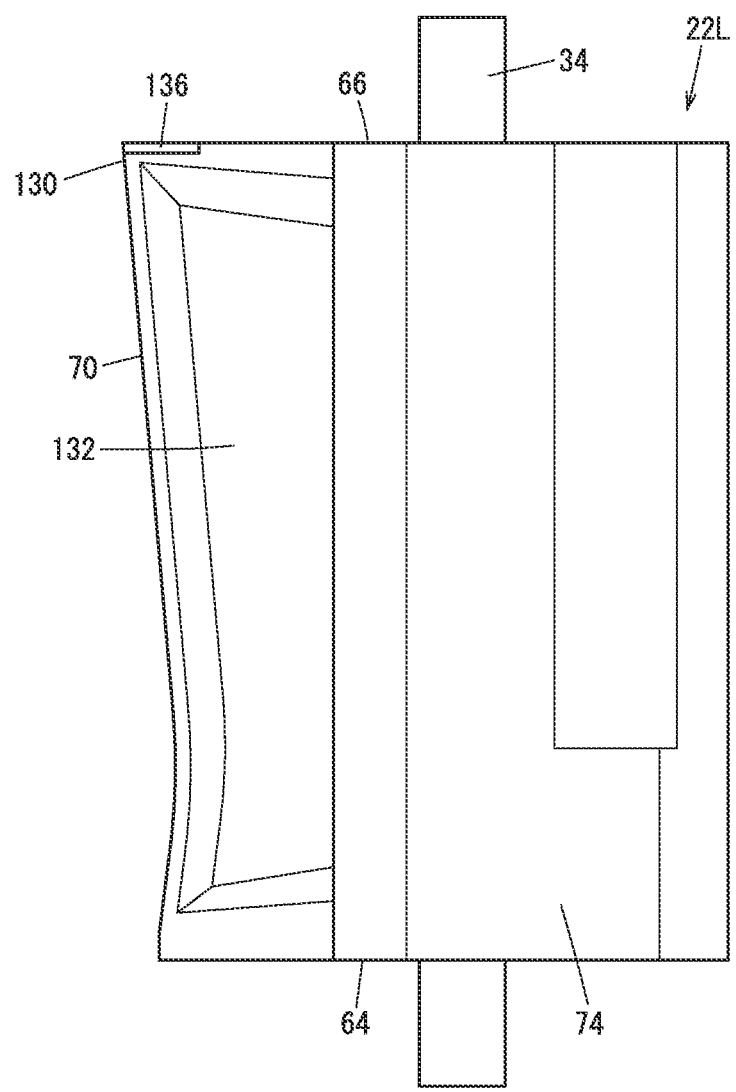
FIG. 6 is a rear view of the rotary core when the front side is viewed from the rear side of a vehicle body.

The cavity forming surface 70 includes the undercut portion molding section 130 for forming the undercut portion 16 (see FIG. 3). FIG. 6 is a rear view of the left rotary core 22L when the front side is viewed from the rear side of the vehicle body. As shown in FIG. 6, a rear surface cutout 132 is formed in the rear surface 74 of the undercut portion molding section 130 that faces the rear side of the vehicle body. The left convex portion 29L enters the rear surface cutout 132.

In FIG. 3, a left end portion of each of the lower surface 64, the front surface 68, and the upper surface 66 of the left rotary core 22L forms the seal portion 134. In the left rotary core 22L, the seal portion 134 is formed in a region from an outer edge portion (edge portion on the outer side in the width direction) to a portion indicated by a dividing line M1. The seal portion 134 prevents the molten resin filling the cavity 25 from leaking from between the left rotary core 22L and the movable mold 24.

Note that the dividing line M1 is an imaginary line for convenience given to the starting point of the tapered inclination. That is, the dividing line M1 is not a line visually recognized actually in the left rotary core 22L. The seal portion 134 is inclined in a tapered shape from the dividing line M1 toward the upper side on the lower surface 64, toward the rear side on the front surface 68, and toward the lower side on the upper surface 66.

Figure 7:
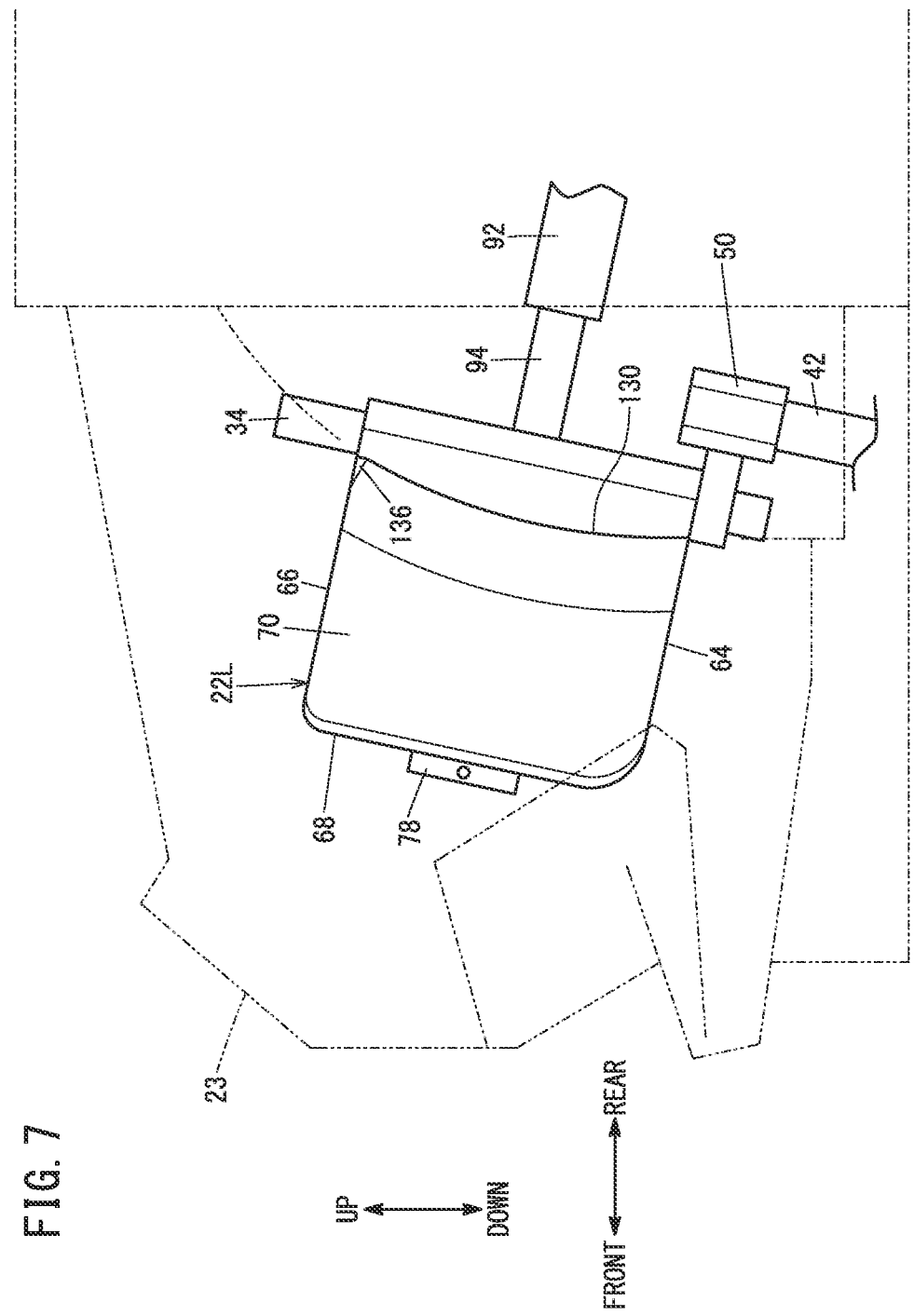
FIG. 7 is a schematic side view of a movable mold viewed from the left side during injection molding.

When the movable mold 24 is viewed from the left side at the time of injection molding, the left rotary core 22L takes the posture shown in FIG. 7. As can be seen from FIG. 7, the rear end portion of the undercut portion molding section 130 that faces the rear side of the vehicle body has an upper end facing upward of the vehicle body and a lower end facing downward. The amount of rearward projection of the upper end is slightly larger than the amount of rearward projection of the lower end.

Figure 8:
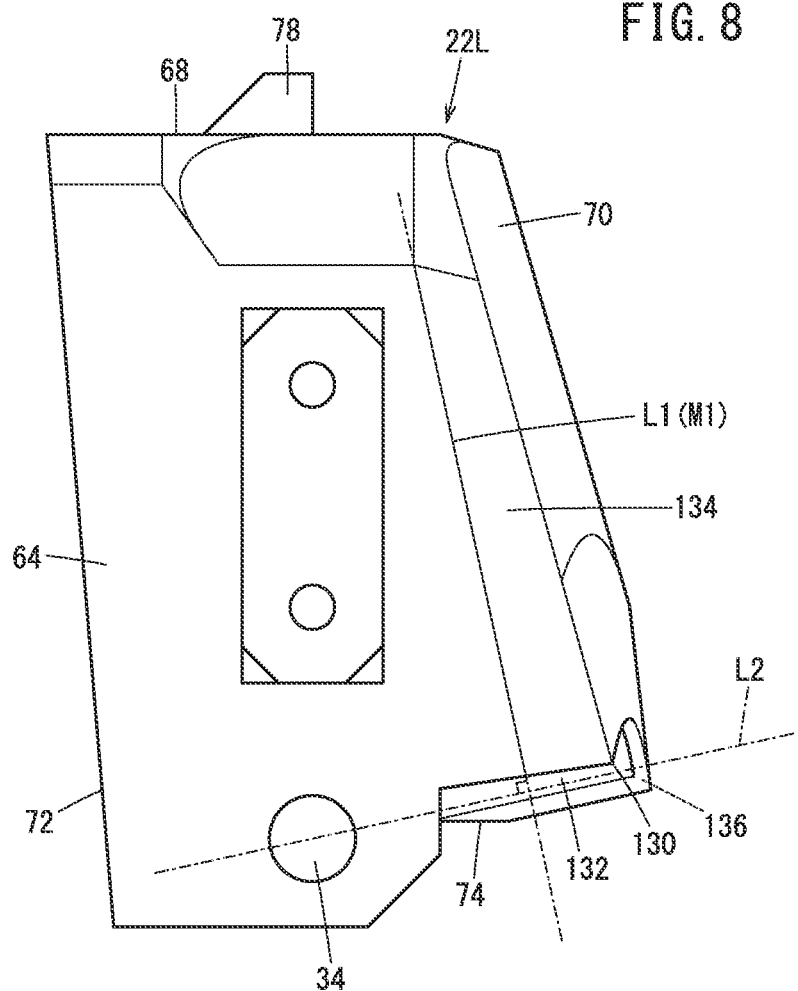
FIG. 8 is a schematic bottom view (side view viewed along the thickness direction) of the rotary core.
Figure 9:
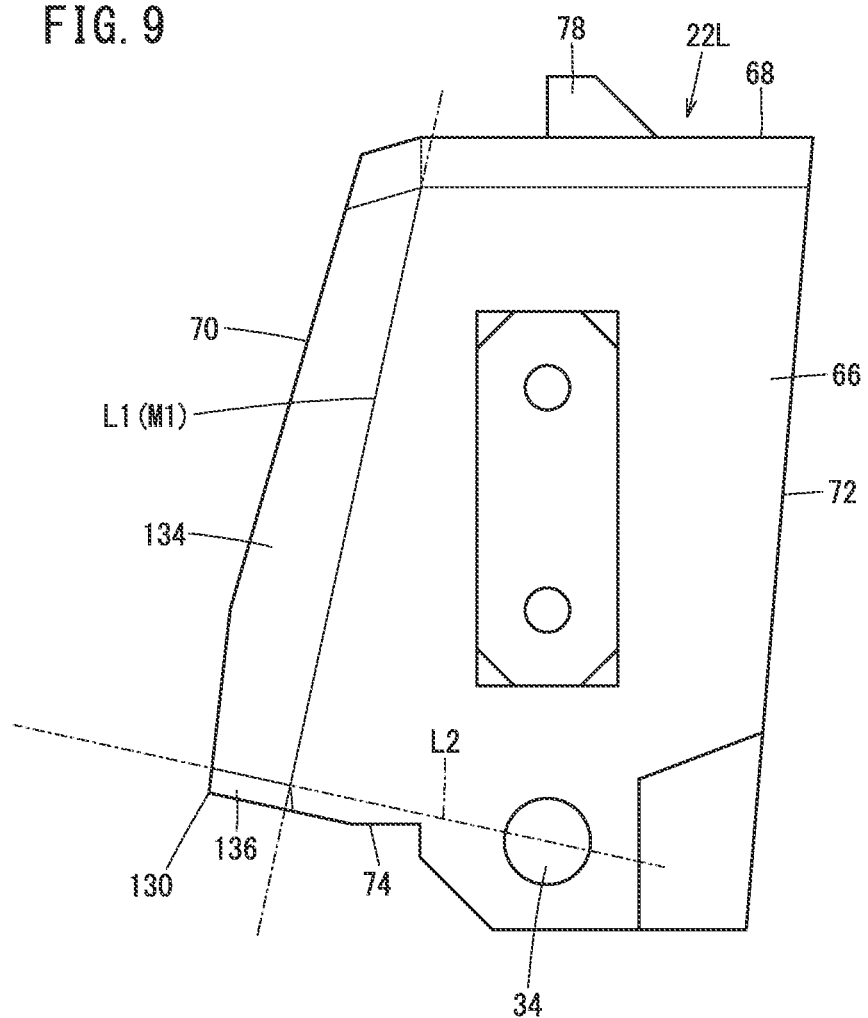
FIG. 9 is a schematic plan view (side view viewed along the thickness direction) of the rotary core.

FIGS. 8 and 9 are a schematic bottom view and a schematic plan view, respectively, of the left rotary core 22L. That is, FIG. 8 shows the lower surface 64 of the left rotary core 22L. On the other hand, FIG. 9 shows the upper surface 66 of the left rotary core 22L.

In FIGS. 8 and 9, the left rotary core 22L is shown in a posture in which the shaft member 34 is positioned on the lower side in the drawing and the undercut portion molding section 130 positioned on the further front side of the vehicle body than the shaft member 34 is positioned on the upper side in the drawing. In the description with reference to FIGS. 8 and 9, the upper side and the lower side of both drawings are referred to as "upper" and "lower", respectively. However, for convenience of explanation, the terms such as "lower surface" and "upper surface" are used as they are.

In FIGS. 8 and 9, the shaft member 34 extends in a direction perpendicular to the paper surface. The extending direction of the shaft member 34 is referred to as a "width direction". The left-right direction in FIGS. 8 and 9 corresponds to the vehicle width direction; however, the left-right direction is referred to as a "thickness direction" to facilitate understanding. Therefore, FIGS. 8 and 9 are side views of the left rotary core 22L viewed along the thickness direction.

FIGS. 8 and 9 each show an inner edge (an inner edge in the width direction) of the seal portion 134, in other words, a first imaginary line L1 extending along the dividing line M1. That is, the first imaginary line L1 is a line extending along the inner edge of the seal portion 134 in a side view in which the left rotary core 22L is viewed along the thickness direction. The first imaginary line L1 is substantially parallel to the ridge line to the edge portion of the cavity forming surface 70 on the upper side (the front side of the front bumper 12) in FIGS. 8 and 9. On the other hand, the inclination angle of the first imaginary line L1 is slightly different from the inclination angle of the ridge line of the edge portion of the cavity forming surface 70 on the lower side (the rear side of the front bumper 12) close to the undercut portion molding section 130.

FIGS. 8 and 9 each also show a second imaginary line L2 extending from the center of the shaft member 34 (the rotation center of the left rotary core 22L) toward the first imaginary line L1. The second imaginary line L2 is orthogonal to the first imaginary line L1.

As can be seen with reference to FIG. 8, on the lower surface 64 of the left rotary core 22L, there is no portion of the seal portion 134 located lower than the intersection of the first imaginary line L1 and the second imaginary line L2 (more rearward of the vehicle body). On the other hand, as shown in FIG. 9, on the upper surface 66 of the left rotary core 22L, there is a portion of the seal portion 134 located lower than the intersection of the first imaginary line L1 and the second imaginary line L2. As understood from FIGS. 6 and 7, this portion is an inclined surface bent toward the lower surface 64 (inward in the width direction) of the left rotary core 22L. Hereinafter, the portion (inclined surface) is referred to as a narrowing surface, and its reference numeral is 136.

As shown in FIG. 7, the narrowing surface 136 of the left rotary core 22L is formed on the upper surface 66 of the left rotary core 22L at a corner edge portion facing the left rear side of the vehicle body. As will be described later, by forming the narrowing surface 136 in this corner edge portion, the left rotary core 22L can rotate.

During mold closing, the left rotary core 22L rotates in a direction to close the left window portion 28L. The bottom wall 28La, the front wall 28Lb, and the ceiling wall 28Lc of the left window portion 28L are inclined in a tapered shape toward a direction substantially orthogonal to a mold closing direction (pressurizing direction) of the left rotary core 22L in order to avoid leakage of molten resin from the left window portion 28L during the mold closing. The seal portion 134 is also inclined in a tapered shape corresponding to the inclination of the bottom wall 28La, the front wall 28Lb, and the ceiling wall 28Lc.

Here, the mold closing direction of the left rotary core 22L is to the right of the paper surface of FIG. 2, that is, to the rear of the vehicle body, in the region lower than the intersection of the first imaginary line L1 and the second imaginary line L2 (the region where the narrowing surface 136 is formed). For this reason, the inclined surface 30 inclined toward the bottom wall 28La from the front side toward the rear side of the vehicle body is provided at the left edge rear end portion of the ceiling wall 28Lc. Further, on the further front side of the vehicle body than the narrowing surface 136 (side upper than the intersection of the first imaginary line L1 and the second imaginary line L2), the mold closing direction of the left rotary core 22L is to the front side of the paper surface of FIG. 2 (the outer side in the vehicle width direction). Therefore, the bottom wall 28La, the front wall 28Lb, and the ceiling wall 28Lc are inclined so as to become narrower from the back side toward the front side of the paper surface of FIG. 2.

The right rotary core 22R and the regulating core 32 housed in the right housing recess 26R are configured in the same manner as described above. Therefore, the same components are denoted by the same reference numerals, and detailed description thereof will be omitted.

The right rotary core 22R and the left rotary core 22L have a mirror symmetry (line symmetry) relationship with each other. That is, also in the right rotary core 22R, in the rear end portion of the undercut portion molding section 130 that faces the rear side of the vehicle body, the upper surface 66 facing the upper side of the vehicle body extends slightly longer than the lower surface 64 facing the lower side. The narrowing surface 136 of the right rotary core 22R is formed on the upper surface 66 of the right rotary core 22R at an edge portion facing the right rear side of the vehicle body. The narrowing surface 136 is an inclined surface extending from the upper surface 66 toward the lower surface 64 of the right rotary core 22R. In other words, the narrowing surface 136 is an inclined surface bent inward in the width direction.

The mold apparatus 10 further includes an injection machine (not shown). The molten resin is injected from the injection machine and introduced into the cavity 25 through a passage (not shown).

In the above configuration, the displacement mechanism, the first cylinder 36, the second cylinder 92, the first position sensor 82, the second position sensor 100, and the injection machine are electrically connected to a control circuit (not shown).

The mold apparatus 10 according to the present embodiment is basically configured as described above. Next, the operation and effect of the mold apparatus 10 will be described in relation to the process of obtaining the front bumper 12 which is a resin molded article. The following operation is executed by the control circuit.

Figure 10:
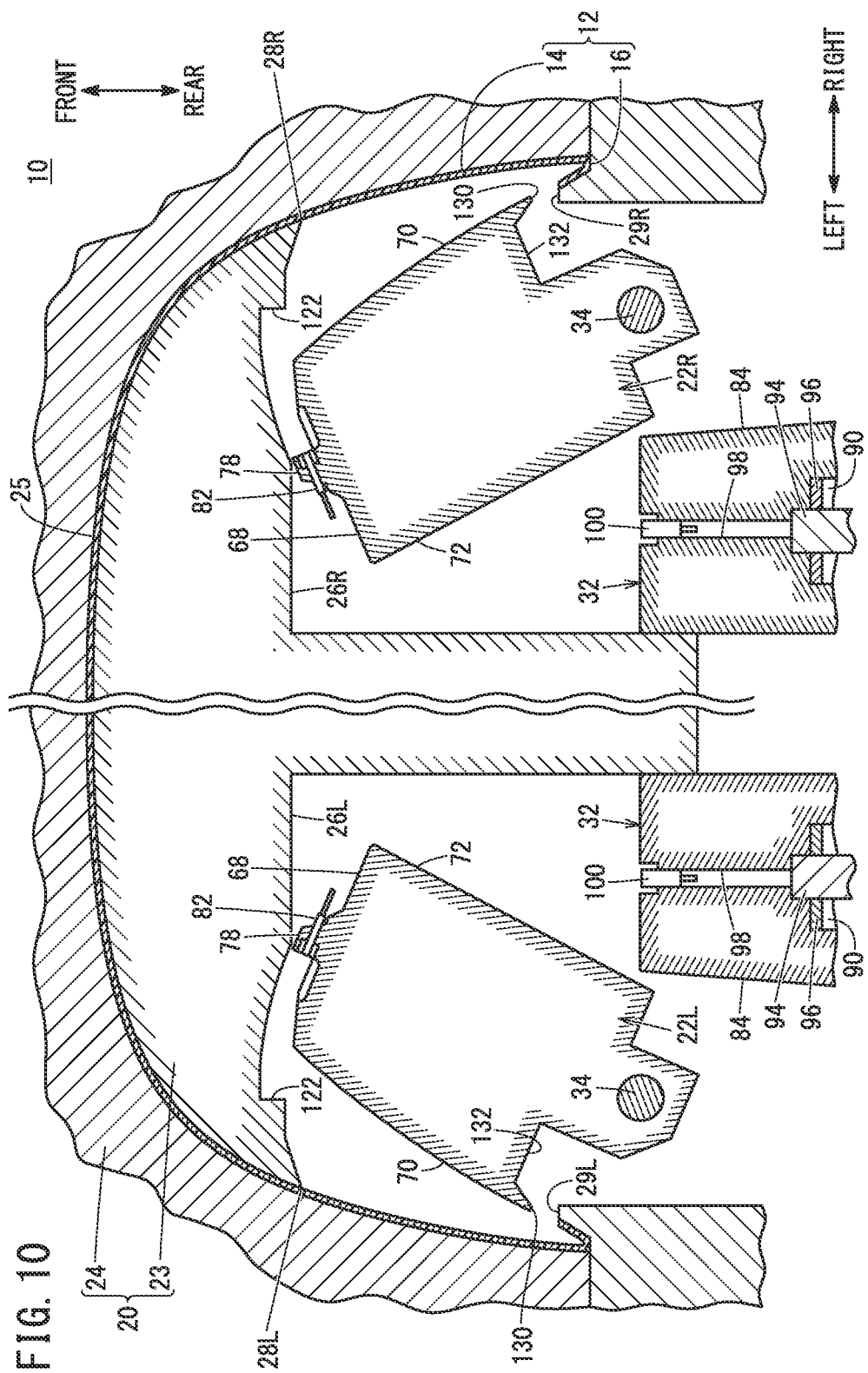
FIG. 10 is a main part schematic plan sectional view showing a state in which the regulating core is retracted from FIG. 1 and the rotary core is rotated.

First, the movable mold 24 approaches the fixed mold 23 by the displacement mechanism. As a result, mold closing is performed and a state as shown in FIG. 10 is obtained. Next, the first rod 40 (see FIG. 3) moves forward in the direction of the arrow C. With this forward movement, the pivot shaft 49 relatively moves in the elongated hole 48 (see FIG. 4). As a result, the first connecting board 46 pivots about the fitting hole 47 in the direction of the arrow X1 in FIG. 3. Further, the connecting shaft 42 rotates in the direction of the arrow X1. This is because the first end of the connecting shaft 42 is fitted into the fitting hole 47.

Further, the U-shaped bracket 50 connected to the second end of the connecting shaft 42 rotates in the direction of the arrow X1. Following the rotation of the U-shaped bracket 50, the second connecting board 56 rotates in the same direction. This is because the second connecting board 56 is inserted into the U-shaped groove 52 and is connected to the U-shaped bracket 50 via the first transmission shaft 58.

The left rotary core 22L and the right rotary core 22R are connected to the second connecting board 56 via the second transmission shaft 62. Therefore, when the second connecting board 56 rotates, each of the left rotary core 22L and the right rotary core 22R rotates about the shaft member 34 in the same direction as the second connecting board 56. The seal portion 134 of the left rotary core 22L comes in sliding contact with the bottom wall 28La and the ceiling wall 28Lc of the left window portion 28L.

Here, the inclined surface 30 is present on the ceiling wall 28Lc of the left window portion 28L. The inclined surface 30 is inclined such that the vicinity of the widthwise outer edge of the rear end portion thereof approaches the bottom wall 28La, from the front side toward the rear side (see FIG. 2).

Further, in the seal portion 134 on the upper surface 66 of the left rotary core 22L, the narrowing surface 136 is formed at a portion located lower than the intersection of the first imaginary line L1 and the second imaginary line L2 (more rearward of the vehicle body) (see FIG. 9). The narrowing surface 136 is inclined in a direction away from the inclined surface 30 of the ceiling wall 28Lc of the left window portion 28L. Therefore, the seal portion 134 on the upper surface 66 of the left rotary core 22L is prevented from interfering with the ceiling wall 28Lc of the left window portion 28L or the inclined surface 30 of the ceiling wall 28Lc.

In addition, the seal portion 134 of the left rotary core 22L abuts on the bottom wall 28La, the front wall 28Lb, and the ceiling wall 28Lc of the left window portion 28L. As described above, the bottom wall 28La, the front wall 28Lb, and the ceiling wall 28Lc are inclined in a tapered shape toward a direction substantially orthogonal to the rotation direction of the left rotary core 22L, and the seal portion 134 is inclined in a tapered shape corresponding thereto. Such inclined surfaces abut on each other as the mold closing is performed, whereby the seal portion 134 serves as a wedge. Therefore, sufficient sealing is achieved between the bottom wall 28La, the front wall 28Lb, and the ceiling wall 28Lc of the left window portion 28L, and the seal portion 134 of the left rotary core 22L. Similarly, the inclined surface 30 abutting on the narrowing surface 136 formed in the portion located lower than the second imaginary line L2 is inclined in a tapered shape toward the direction substantially orthogonal to the rotation direction of the left rotary core 22L. Therefore, as the mold closing is performed, the narrowing surface 136 and the inclined surface 30 abut on each other. As a result, since the narrowing surface 136 serves as a wedge, the sealing performance is also ensured at this point.

The same applies to the seal portion 134 of the right rotary core 22R and the right window portion 28R. As described above, in the present embodiment, the seal portions 134 of the left rotary core 22L and the right rotary core 22R do not include portions that interfere with the movable mold 24 during rotation of the left rotary core 22L and the right rotary core 22R. Therefore, even when the positions of the rotation centers (shaft members 34) of the left rotary core 22L and the right rotary core 22R are slightly displaced from the design positions, the seal portions 134 are prevented from interfering with the movable mold 24.

As a result, according to the present embodiment, it is possible to avoid interference between the left rotary core 22L and the right rotary core 22R, and the fixed mold 23 which is a part of the mold main body 20, when the left rotary core 22L and the right rotary core 22R rotate. In addition, sufficient sealing performance can be obtained between the inner walls of the left window portion 28L and the right window portion 28R, and the seal portions 134 of the left rotary core 22L and the right rotary core 22R.

When the left rotary core 22L and the right rotary core 22R rotate, the stopper portion 78 rotationally moves along the curve in the vicinity of the latching portion 122. Thereafter, the stopper portion 78 abuts on and is latched by the latching portion 122. As a result, the rotation of the left rotary core 22L and the right rotary core 22R is stopped. That is, the left rotary core 22L and the right rotary core 22R are positioned. This latching is detected by the first position sensor 82. By receiving the detection signal produced at this time, the control circuit recognizes that "the stopper portion 78 has been latched and the left rotary core 22L and the right rotary core 22R have stopped".

The left rotary core 22L and the right rotary core 22R after rotation take the postures shown in FIGS. 1 and 3. With the rotation, the left convex portion 29L and the right convex portion 29R enter the rear surface cutouts 132 of the left rotary core 22L and the right rotary core 22R, respectively. Further, the cavity forming surfaces 70 of the left rotary core 22L and the right rotary core 22R enter the left window portion 28L and the right window portion 28R, respectively. By this entry, the left window portion 28L and the right window portion 28R are closed by the cavity forming surfaces 70.

The biasing of the first cylinder 36 is continued thereafter. That is, a force for moving the first rod 40 forward is applied to the first rod 40. Therefore, rotary driving force toward the cavity 25 is applied to the left rotary core 22L and the right rotary core 22R via the first connecting board 46, the connecting shaft 42, and the second connecting board 56. However, since the stopper portion 78 is in abutment on the latching portion 122 as described above, the left rotary core 22L and the right rotary core 22R do not rotate any further. That is, the left rotary core 22L and the right rotary core 22R are maintained in the stopped positions.

Next, by driving the left and right second cylinders 92, the left and right second rods 94 and the left and right regulating cores 32 move forward toward the front of the vehicle body. The left and right regulating cores 32 that have moved forward enter the left housing recess 26L and the right housing recess 26R, respectively. As a result, as shown in FIG. 1, the left regulating core 32 is interposed between the left rotary core 22L and the fixed mold 23. The right regulating core 32 is interposed between the right rotary core 22R and the fixed mold 23. At the time of entering, the regulating surface 84 comes into sliding contact with the supported surface 72. Since the regulating surface 84 and the supported surface 72 are inclined, both surfaces serve as cam surfaces. This makes it easy for the left and right regulating cores 32 to enter between the left rotary core 22L and the fixed mold 23 and between the right rotary core 22R and the fixed mold 23, respectively. In this manner, the left and right regulating cores 32 are interposed between the left rotary core 22L and the fixed mold 23 and between the right rotary core 22R and the fixed mold 23 in a state in which the regulating surfaces 84 abut on the supported surfaces 72, and function as wedges.

When the left and right regulating cores 32 move forward by predetermined distances, the left and right second position sensors 100 detect that the closed surfaces of the left housing recess 26L and the right housing recess 26R approach the left and right second position sensors 100. At this time, the left and right second position sensors 100 transmit detection signals to the control circuit. Upon receiving the detection signals, the control circuit stops the second rods 94. With this stop, the regulating cores 32 also stop. At this time, slight clearances are formed between the front surfaces of the left and right regulating cores 32, and the closed surfaces of the left housing recess 26L and the right housing recess 26R.

Here, the distal end of the small-diameter cylindrical portion 116 of the abutment member 102 protrudes from the housing hole 104 of the regulating core 32. The protruding distal end abuts on each of the closed surfaces of the left housing recess 26L and the right housing recess 26R. After that, since the regulating core 32 still moves forward slightly, the coil spring 120 is compressed.

In this manner, the cavity 25 is formed as a result of mold closing, rotation of the left rotary core 22L and the right rotary core 22R, and entry of the left and right regulating cores 32 into the left housing recess 26L and the right housing recess 26R. The control circuit then energizes the injection machine to inject the molten resin. Thus, the molding step is performed.

The injected molten resin passes through the passage and reaches the cavity 25. That is, the cavity 25 is filled with the molten resin. Therefore, resin pressure toward the left and right regulating cores 32 acts on the left rotary core 22L and the right rotary core 22R.

Also during the molding step, the rotary driving force toward the cavity 25 is applied to the left rotary core 22L and the right rotary core 22R as described above. This rotary driving force acts as a reaction force, and the regulating cores 32 function as wedges. This prevents the left rotary core 22L and the right rotary core 22R from being pushed toward the left and right regulating cores 32 even though the resin pressure is acting on the rotary cores. In other words, the left rotary core 22L and the right rotary core 22R maintain their respective positions.

In the present embodiment, the first cylinders 36 are employed as the rotary driving devices, and the rotary driving force is directly input from the first cylinders 36 to the left rotary core 22L and the right rotary core 22R. Thus, the left rotary core 22L and the right rotary core 22R are firmly positioned. Therefore, even when the left rotary core 22L and the right rotary core 22R receive the resin pressure, it is possible to prevent the left rotary core 22L and the right rotary core 22R from being pushed toward the regulating cores 32 as described above.

By the molten resin injected into the cavity 25 being cooled and solidified, the front bumper 12 having a shape corresponding to the shape of the cavity 25 is obtained. The front bumper 12 has the main body portion 14 mainly molded by the fixed mold 23 and the movable mold 24, and the undercut portion 16 molded by the undercut portion molding section 130 and the rear surface cutout 132.

Next, a releasing step is performed. To perform this step, the control circuit performs control so that the above-described operations are performed in reverse order. That is, first, by retracting the second rods 94, the left and right regulating cores 32 are integrally retracted. When this retraction starts, the front surfaces of the left and right regulating cores 32 do not abut on the closed surfaces of the left housing recess 26L and the right housing recess 26R. Further, when the retraction starts, the small-diameter cylindrical portions 116 of the abutment members 102 start to separate from the closed surfaces, whereby the compressed coil springs 120 expand. Therefore, the abutment members 102 are elastically biased toward the movable mold 24, and the distal ends of the abutment members 102 press the closed surfaces. By this pressing, the regulating cores 32 are pushed out in the direction in which the regulating cores 32 retract.

In general, a larger driving force is required when the regulating core 32 is moved away (retracted) from between the left rotary core 22L or the right rotary core 22R and the fixed mold 23 than when the regulating core 32 is made to enter (moved forward) between the left rotary core 22L or the right rotary core 22R and the fixed mold 23. However, according to the present embodiment, the retraction of the regulating core 32 is assisted as described above.

Therefore, the driving force required for retraction can be reduced as compared with the case where the abutment member 102 is not provided.

Moreover, in the present embodiment, as described above, the left rotary core 22L and the right rotary core 22R are prevented from being pushed toward the left and right regulating cores 32 during the molding step. Therefore, since the left rotary core 22L and the right rotary core 22R are prevented from interfering with the left and right regulating cores 32, the left and right regulating cores 32 smoothly retract without being hindered by the left rotary core 22L and the right rotary core 22R. As a result, the left rotary core 22L and the right rotary core 22R are released from the regulation by the left and right regulating cores 32.

When the control circuit, which has recognized that the retraction of the regulating core 32 has ended, then retracts the first rod 40 (see FIG. 3) of the first cylinder 36 in the direction of the arrow C. As a result, the first connecting board 46 pivots about the fitting hole 47 in the direction of the arrow X2 in FIG. 3. Following this, the U-shaped bracket 50 and the second connecting board 56 rotate in the direction of the arrow X2. Since the left and right regulating cores 32 have already been retracted from the left housing recess 26L and the right housing recess 26R, the left rotary core 22L and the right rotary core 22R also integrally rotate in the direction of the arrow X2. As a result, the left rotary core 22L and the right rotary core 22R move away from the left and right undercut portions 16. The stopper portions 78 are also separated from the latching portions 122 to be in the state shown in FIG. 10.

Also during this rotation, for the same reason as described above, the seal portion 134 on the upper surface 66 of the left rotary core 22L is prevented from interfering with the ceiling wall 28Lc of the left window portion 28L, the inclined surface 30 of the ceiling wall 28Lc, and the like. Similarly, the seal portion 134 on the upper surface 66 of the right rotary core 22R is prevented from interfering with the ceiling wall of the right window portion 28R, the inclined surface of the ceiling wall, or the like. Therefore, the left rotary core 22L and the right rotary core 22R rotate smoothly. Further, the rear surface cutouts 132 of the left rotary core 22L and the right rotary core 22R move away from the left convex portion 29L and the right convex portion 29R, respectively.

After the left rotary core 22L and the right rotary core 22R are released from the left and right undercut portions 16 in this manner, the displacement mechanism retracts the movable mold 24 to separate the movable mold 24 from the fixed mold 23. Thus, the front bumper 12 is exposed. The front bumper 12 is pushed out by the forward movement of an eject pin (not shown) and released from the fixed mold 23.

It should be noted that the present invention is not limited to the above-described embodiment, and can employ various configurations without departing from the gist of the present invention.

For example, the left rotary core 22L and the right rotary core 22R can be released from the left and right undercut portions 16 after the movable mold 24 is retracted and separated from the fixed mold 23.

In addition, in each of the left rotary core 22L and the right rotary core 22R, in a case where a portion which is located lower than the second imaginary line L2 exists in the seal portion 134 on the lower surface 64, the narrowing surface 136 is also formed in the portion. On the other hand, in each of the left rotary core 22L and the right rotary core 22R, in a case where a portion which is located lower than the second imaginary line L2 does not exist in the seal portion 134 on the upper surface 66, it is not necessary to form the narrowing surface 136 on the upper surface 66.

Further, the present invention is not limited to the mold apparatus 10 for molding the front bumper 12 as a resin molded article. That is, the present invention can be applied to general mold apparatuses for manufacturing resin molded articles having undercut portions.

What is claimed is:

1. A mold apparatus that molds a resin molded article including a main body portion and an undercut portion, the mold apparatus comprising:
    a mold main body configured to mold the main body portion, and having a window portion formed therein;
    a rotary core including an undercut portion molding section configured to rotate in a direction in which the undercut portion molding section enters or moves away from the window portion, mold the undercut portion when entering the window portion, and move away from the undercut portion when moving away from the window portion;
    a regulating core configured to regulate rotation of the rotary core by entering between the mold main body and the rotary core and supporting the rotary core during molding, and move away from between the mold main body and the rotary core when the rotary core is released from the undercut portion;
    a shaft member configured to support the rotary core on the mold main body and serving as a rotation center of the rotary core;
    a rotary driving device configured to apply a rotary driving force to the rotary core to rotate the rotary core about the shaft member,
    wherein the rotary core includes a seal portion configured to abut on the mold main body to seal between the rotary core and the mold main body, and
    in a case where a side where the shaft member is located is defined as a lower side, a side where the undercut portion molding section is located is defined as an upper side, a direction in which the shaft member extends is defined as a width direction, and a direction orthogonal to the width direction is defined as a thickness direction, when a first imaginary line extending along an inner edge of the seal portion and a second imaginary line extending from the rotation center of the rotary core toward the first imaginary line and orthogonal to the first imaginary line are drawn in a side view in which the rotary core is viewed along the thickness direction, the seal portion includes a portion that is located on a lower side of the second imaginary line and is bent inward in the width direction as compared with a portion of the seal portion that is located on an upper side of the second imaginary line, whereby the seal portion is formed with a narrowing surface, and
    a wall portion forming the window portion is formed with an inclined surface that abuts on the narrowing surface in a case where the rotary core enters the window Portion.

2. The mold apparatus according to claim 1, further comprising a driving force transmission shaft configured to transmit the rotary driving force of the rotary driving device to the rotary core,
    wherein the driving force transmission shaft is disposed with an offset from the shaft member.

3. The mold apparatus according to claim 1, wherein the rotary core is provided with a stopper configured to abut on the mold main body to maintain the rotary core in a stopped position during molding.

4. The mold apparatus according to claim 1, wherein the regulating core is provided with an abutment member that is elastically biased toward the mold main body and protrudes from the regulating core to abut on the mold main body.

5. The mold apparatus according to claim 3, further comprising a control device configured to control the rotary driving device,
    wherein the control device causes the rotary driving device to apply the rotary driving force to the rotary core even after mold closing.

* * * * *